Jan. 30, 1968   W. A. NOBLE   3,366,412
PASSENGER SEAT FOR THE WINDOW OF A VEHICLE
Filed Oct. 13, 1965   2 Sheets-Sheet 2
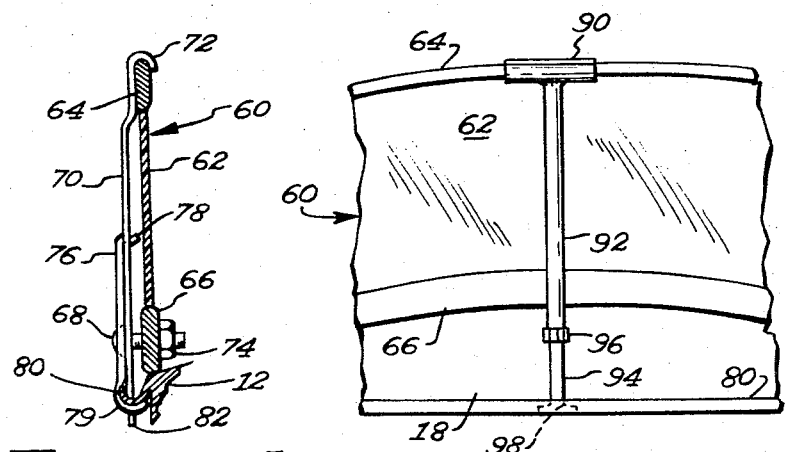
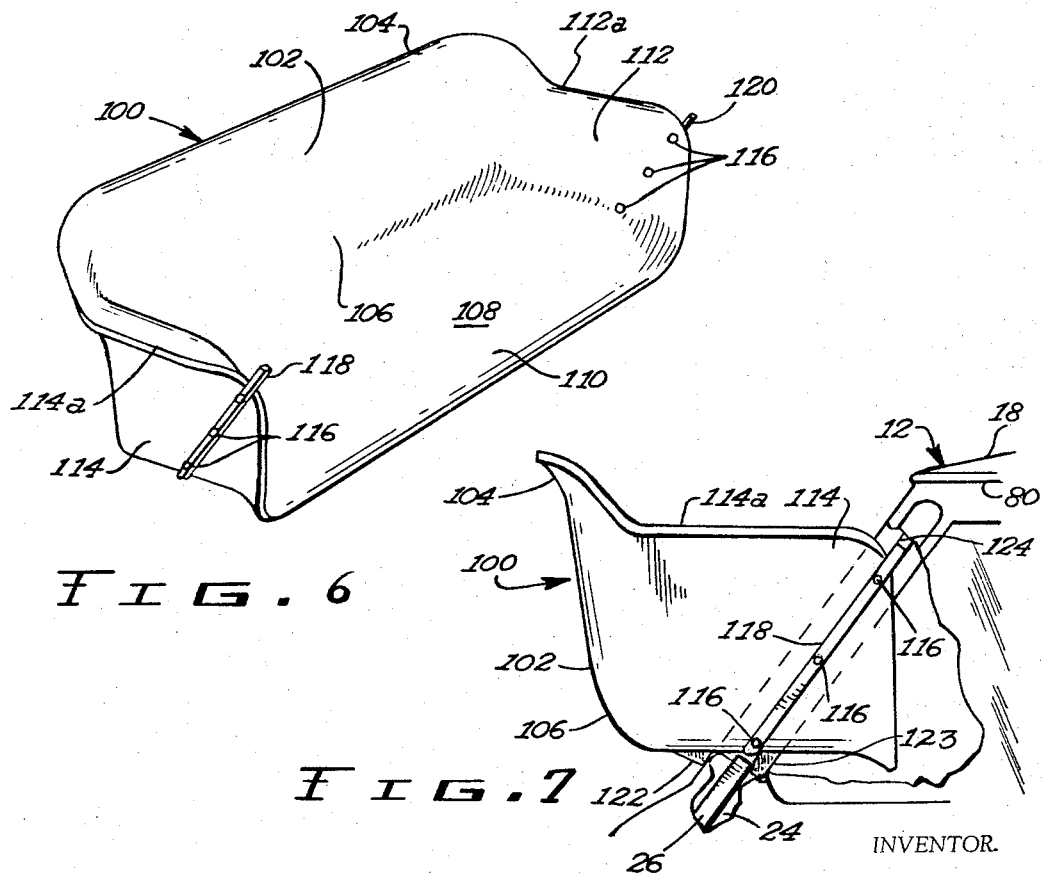
INVENTOR.
WILLIAM A NOBLE
BY
*James V. Harmon*
ATTORNEY

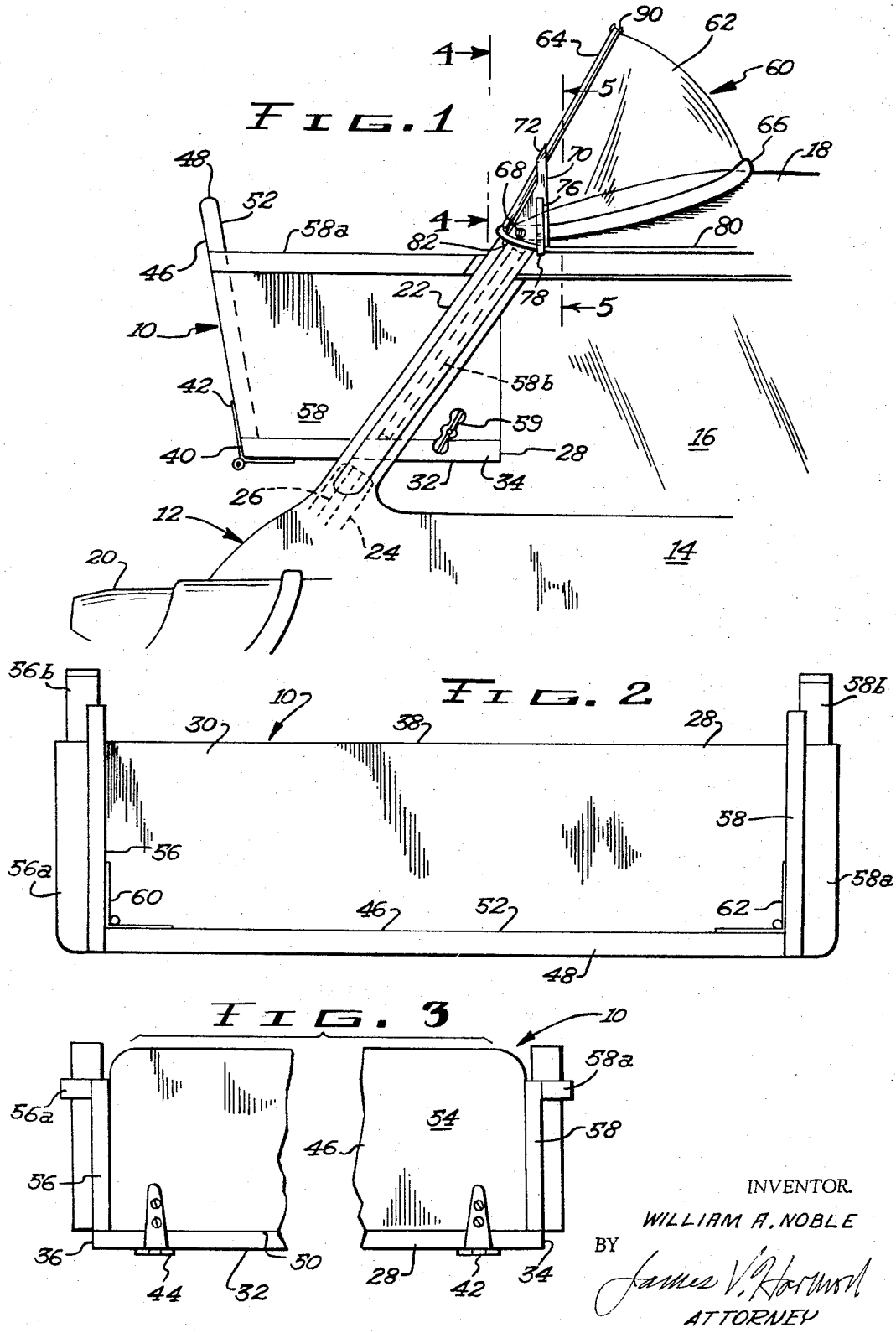

United States Patent Office 3,366,412
Patented Jan. 30, 1968

1

3,366,412
PASSENGER SEAT FOR THE WINDOW
OF A VEHICLE
William A. Noble, 2191 Como Ave.,
St. Paul, Minn. 55108
Filed Oct. 13, 1965, Ser. No. 495,391
5 Claims. (Cl. 296—64)

ABSTRACT OF THE DISCLOSURE

A vehicle having a window seat mounted in one of its windows, e.g. seat having back and sides with arm rests, is placed in the rear window of a stationwagon above the tailgate. Passengers (usually children) can be seated from inside or outside. A windshield is placed on rear portion of the vehicle roof.

---

The present invention relates to seats for a vehicle and more particularly to a scenic observation seat for the rear window of a vehicle such as a stationwagon.

Travel in an automobile has many special problems. The problems produced by child passengers are well known even to those who have only traveled a short distance with several children in the back seat of a car or stationwagon. The noise and clamor they produce is not only unpleasant but can be dangerous since it tends to distract the drivers' attention from the road. A principal objective of the invention is to make traveling in vehicles such as a stationwagon more pleasant for the drivers and for the children in the vehicle as well.

I have found that many of these difficulties can be corrected by improved seating. The seats customarily used in vehicles such as automobiles, trucks, stationwagons, and the like provide for seating passengers within the vehicle and accordingly do not permit overhead viewing. Moreover, observation towards the sides is almost always partially obstructed. The seats, in addition, usually place the passenger close to the driver which increases the likelihood of his being distracted. Furthermore, conventional automobile seating shelters the passengers from the stream of air passing over the automobile and thereby deprives the passengers of much of the pleasure associated with the automobile travel.

A variety of specially constructed seats have been provided in vehicles such as the rumbleseat used widely over a period of many years on coupe automobiles produced by several manufacturers. These seats did not permit a passenger to move from the interior of the vehicle to the seat. Furthermore, a rumbleseat must be supplied as original equipment by the manufacturer and can not be readily installed by the owner of the vehicle. They also occupy a substantial portion of the rear of the vehicle and render it unsuitable for other important functions such as the transportation of luggage or equipment.

A variety of other vehicle seats have been proposed but these have been to some extent ineffective in operation, do not place the person using them in a desirable position for scenic observation, are complicated in construction or expensive to produce.

In view of these and other shortcomings of the prior art it is one object of the invention to provide an improved scenic observation seat for a vehicle.

Another object of the present invention is the provision of an improved scenic observation seat for the rear window opening of a station wagon.

Another object of the invention is the provision of an improved seat of the type described which will occupy a relatively small space when in storage and can be easily and quickly mounted and removed from the position taken during use.

2

Yet another object of the invention is the provision of an improved seat of the type described which will remain reliably and in its mounted position within a window opening after being installed.

Yet another object of the invention is the provision of an improved seat of the type described which can be installed without the use of special fasteners or tools.

Still another object of the invention is the provision of an improved seat of the type described having a smoothly contoured surface to assure comfort for passengers.

Still another object of the invention is the provision of an improved seat of the type described having a means for at least partially shielding the passenger from the air passing over the vehicle.

A further object of the invention is to provide the combination of a scenic observation seat and windshield for a stationwagon.

Still a further object of the invention is the provision of an improved windshield of the type described having a fastening means for quickly attaching it to the vehicle upon which it is to be used.

These and other more detailed and specific objects will be apparent in view of the following specification and the attached drawings wherein:

FIGURE 1 is a partial side elevational view of the rearward end of a stationwagon with a seat embodying the invention in position for use;

FIGURE 2 is a view of the seat of FIGURE 1 as seen from above;

FIGURE 3 is a rear elevational view of the seat of FIGURES 1 and 2;

FIGURE 4 is a partial rear elevational view taken on line 4—4 and on a slighly enlarged scale relative to FIGURE 1;

FIGURE 5 is a vertical sectional view taken on line 5—5 and on a greatly enlarged scale relative to FIGURE 1;

FIGURE 6 is a perspective view of a seat according to another embodiment of the invention; and FIGURE 7 is a partial side elevational view of the seat illustrated in FIGURE 6 but on a slightly enlarged scale.

Briefly stated, the present invention provides a scenic observation seat and a fastening means for safely securing the seat adjacent the rear window opening of a stationwagon. The invention preferably includes a shield positioned immediately above and mounted upon the rearward portion of the vehicle in position to deflect the air around the person using the seat.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

As shown in FIGURES 1 through 5 is a seat indicated generally at 10 which is mounted during use at the rear of a vehicle 12. The vehicle 12 is a stationwagon having an entirely conventional body construction with side body walls 14, side windows 16, roof 18, taillight 20 and a rear wall 22. The rear wall 22 includes a tailgate 24, only a part of which is shown by dotted lines of FIGURE 1. The tailgate also includes a window 26 which can be raised and lowered conventionally. When the tailgate is in its raised position and the window 26 is lowered, the seat 10 can be installed in the window opening above tailgate as described hereinbelow.

The seat 10 includes a horizontally disposed and generally rectangular floor or deck 28 having a lower surface 32 adapted to rest upon the upward edge tailgate 24. The deck portion 28 also includes side edges 34 and 36, a front edge 28 and a rearward edge 40. Suitably secured to the deck portion 38 as by hinges 42 and 44 is a backrest 46 having an arcuate upper edge 48 a lower edge 50 abutting the upper surface of the deck portion 28 when the seat 10 is in its position for use. The backrest 46 includes a forwardly facing surface 52 and a rearward surface 54.

Extending forwardly from the sides of the backrest are a pair of vertically disposed parallel sidewalls 56 and 58. The sidewalls 56 and 58 are pivotally secured to the backrest 46 as by means of hinges 60 and 62. Secured to the upward edges of sidewalls 56 and 58 are arm support rests 56a and 58a respectively. The upper surfaces of each arm rest is coplanar with the upper edge of the sidewall to which it is connected. Suitably secured to the outward surfaces of the sidewalls 56 and 58 are forwardly and upwardly inclined retaining elements 56b and 58b respectively. These elements extend laterally a short distance from the sidewalls and are mounted at the same angle of inclination relative to the top and bottom edges of the sidewalls 56 and 58 as the tailgate 24 is positioned relative to the horizontal. The upward ends retainers extend a short distance beyond the upper surface of the arm rest 56a and 58a.

Although it is desirable to place the passengers where they will be exposed to the flow of air around the vehicle, I found it advantageous to provide at least partial shielding when it is desired.

Refer now particularly to FIGURES 1, 4, and 5 in connection with the windshield 60. The windshield 60 comprises shield member 62 formed from a transparent sheet material such as polymethylmethacrylate and is bounded on the upper and lower edges by metal rims 64 and 66. Secured to each rearward end of rim 66 by the provision of a bolt 68 is a generally triangular bracket 70 formed from sheet metal. Only one bracket 70 is shown since they are identical. Each bracket 70 includes an upwardly extending and centrally curved hooked portion 72 appropriately shaped to fit the upward edge of the rim 64 as clearly shown in FIGURE 5. The bolt 68 extends through the rim 66 and secured in position by means of a nut 74. Mounted upon the outward surface of the bracket 70 is a vertically disposed clamp 76 including a tongue 78 at its upward end which projects through a horizontal slot in the bracket 70. The lower end of the clamp 76 is curved centrally at 79 to provide a snap fit around the lower aspect of the rain gutter 80. At the rearward corner of the bracket 70 is a downwardly and rearwardly extending tongue 82 which projects through a bored opening in the gutter 80.

Pivotally mounted upon the forward edge of each wall 56 and 58 is a fastener 59 (only one of which is shown). When the seat 10 is to be used, the fastener is pivoted so that a portion extends over and abuts the outward edges 34 and 36 of the deck 28.

Removably secured to the rim 64 is a U-shaped spring metal clip 90 as seen in FIGURES 1 and 4. Affixed to the clip 90 and extending downwardly and rearwardly therefrom is a strut 92 which can also be formed from tubing. Fitting within the strut 92 is a threaded rod 94 which has mounted upon its upper end a bolt 96. The rod has a horizontally disposed member 98 which rests in the gutter 80 when the shield 60 is to be used. The seat 10 can be formed from any variety of materials such as wood, metal, fiberglass reinforced plastic and the like. It can also be formed from a composite of materials such as aluminum tubing and fabric webbing or of fiberglass and metal sheeting. A variety of other materials will be immediately apparent to those skilled in the art.

The operation of the seat 10 and the shield 60 will now be described. For the purpose of this description it will be assumed that the seat 10 is initially in a collapsed condition. The thickness of the seat 10 when collapsed is the combined thickness of the rear wall, the deck and the sidewalls. The width is the same as it is when the seat is folded to position required for use. When collapsed the seat 10 occupies very little space, can be easily stored in an automobile trunk or behind the interior seats of the stationwagon 12. To unfold the seat from the collapsed condition, the sidewalls 56 and 58 are first pivoted upon hinges 60 and 62 until they are almost perpendicular to the rear wall 46. Next, the deck portion 28 is pivoted forwardly from a collapsed position abutting the rearward surface 54 of the backrest 46 through an angle of approximately 265° in a counterclockwise direction as seen in FIGURE 1 until it contacts the lower edges of sidewalls 56 and 58.

Next, the window 26 is lowered and the seat is placed in the opening above the tailgate. The sidewalls 56 and 58 are then pivoted outwardly about hinges 60 and 62 until the retainers 56b and 58b extend into the elongated channels in the rear wall 22 which normally supports the side edges of the window 26. Each fastener 59 is then turned until one thereof extends below the side edges 34 and 36 of the deck 28. The seat 10 is now installed and the shield 60 can be placed in position. To install the shield 60, each tongue 82 is placed in one of the bored openings of the gutter 80. The lower ends of the clamps 76 are then pressed centrally so that the curved portions 79 snap fit over the lower edge of the gutter 80 on each side of the vehicle. The threaded member 34 is then placed in the strut 92 and the bolt 96 is turned appropriately to produce an upward pressure on the strut 92. The shield 60 will then be securely locked in position. If desired, an additional retaining means such as a suction cup (not shown) can be employed for securing the front ends of the rim 66 to the roof 18 of the stationwagon 12.

After the seat 10 has been installed, a person can easily take a seated position on it from either the inside or outside the vehicle. Moreover, a person using the seat 10 can enter the vehicle and conveniently return to the seat while the vehicle is in motion.

Refer now particularly to FIGURES 6 and 7 which illustrate another embodiment of the invention. In FIGURE 7 there is shown a stationwagon 12 in all respects similar to that illustrated in FIGURES 1, 4, and 5. The seat 100 in this instance is formed from a rigid but flexible piece of fiberglass reinforced plastic sheet material having a bracket portion 102 that has a convexly curved upward edge as seen from the front and a forwardly curved lower portion 106 continous with the horizontally disposed deck portion 108. The deck portion includes a downwardly and rearwardly curved rearward portion 110. Integral with the deck 108 and rear wall 102 are sidewalls 112 and 114 having horizontally disposed arm rests 112a and 114a. Rigidly secured as by means of rivets 116 to the outward surfaces of sidewalls 112 and 114 are forwardly and upwardly inclined retaining elements 118 and 120 formed from a suitable durable material such as square steel bar stock. Rigidly affixed to the lower surface of the set 100 is a stop member 122 for purposes hereinafter described. Spaced forwardly of stop 122 is a stop 123.

When the seat 100 is to be installed, the window 26 is first lowered, the retainers 118 and 120 are pressed centrally in other words toward one another until they can be introduced into the window opening of the tailgate 24. They are then allowed to spring outwardly until the retainers 118 and 120 extend into the channels 124 (only one of which is shown) on each side of the window opening. The window 26 is then raised a small distance (about a quarter of an inch will be satisfactory) until the upward edge of the window abuts against the rearward surface of stop 123 thereby securely retaining the seat 100 in a mounted position within the window opening as clearly shown in FIGURE 7. The stop 122 will prevent any undesired downward movement of the deck portion 108 by supporting the deck from the rearward surface of the tailgate 124. Although no shield has been shown in FIGURE 7 it is understood that a shield similar to the shield 60 can be employed if desired.

It is apparent that many modifications and variations of this invention as hereinabove set forth may be made without departing from the spirit and scope thereof. The specific embodiments described are given by way of example only and the invention is limited only by the terms of the appended claims.

I claim:

1. The combination of a stationwagon and a scenic observation seat for the rear window of the stationwagon comprising a seat assembly including a horizontally disposed personnel supporting surface, a substantially vertically disposed backrest, sidewalls, and a retaining member upon the outward surface of each of the sidewalls for supporting the seat within the window opening above the tailgate of said stationwagon.

2. The apparatus according to claim 1 wherein the retaining element comprises an elongated member adapted to extend into the channels on the sides of said window opening.

3. The apparatus according to claim 2 including a transparent shield affixed to the roof of the vehicle forwardly of the seat.

4. The combination of a stationwagon and a scenic observation seat for the rear window of the stationwagon comprising a seat assembly including a horizontally disposed personnel supporting surface, a substantially vertically disposed backrest, said stationwagon having a front and rear portion, said rear portion including a tailgate having said window therein, a retaining means on the seat for securing the seat to the stationwagon with said supporting surface located in approximate alignment with the upper edge of the tailgate and said retaining means being connected to said rearward portion of said stationwagon for supporting the seat within the window opening above the tailgate of said stationwagon.

5. The combination of claim 4 wherein the seat includes walls hingedly secured at their rearward ends to said backrest, said side walls being adapted to swing centrally upon the hinges and said supporting surface hingedly secured to the said backrest and adapted to swing about the hinged connection to a position abutting the said backrest.

References Cited

UNITED STATES PATENTS

| | | | |
|---|---|---|---|
| 1,954,590 | 4/1934 | Hanson | 182—53 |
| 2,528,676 | 11/1950 | Walters | 297—17 |
| 2,532,590 | 12/1950 | Anastasi | 297—217 |
| 3,151,906 | 10/1964 | Roberts | 296—66 |

LEO FRIAGLIA, *Primary Examiner.*

J. H. BRANNEN, J. A. PEKAR, *Examiners.*